United States Patent [19]

Muramoto

[11] Patent Number: 4,817,754
[45] Date of Patent: Apr. 4, 1989

[54] AUTOMOTIVE SEAT BELT SYSTEM AND RETRACTOR DEVICE FOR SEAT BELT SYSTEM

[75] Inventor: Hisao Muramoto, Hiroshima, Japan

[73] Assignee: Mazda Motor Corporation, Japan

[21] Appl. No.: 186,220

[22] Filed: Apr. 26, 1988

[30] Foreign Application Priority Data

Apr. 27, 1987 [JP] Japan .............................. 62-103677
Apr. 27, 1987 [JP] Japan .............................. 62-103678

[51] Int. Cl.$^4$ .............................................. B60R 21/10
[52] U.S. Cl. .................................... 180/268; 280/803; 280/806; 280/808
[58] Field of Search ............... 180/268; 280/801, 803, 280/806, 808

[56] References Cited

U.S. PATENT DOCUMENTS

| | | | |
|---|---|---|---|
| 3,679,229 | 7/1972 | Weststrate | 280/803 |
| 3,764,161 | 10/1973 | Bright et al. | 180/268 |
| 3,819,196 | 6/1974 | Bouthors et al. | 180/268 |
| 4,007,802 | 2/1977 | de Rosa | 280/803 |
| 4,296,942 | 10/1981 | Clifford | 280/803 |
| 4,412,691 | 11/1983 | Murphy et al. | 280/803 |

Primary Examiner—Kenneth R. Rice
Attorney, Agent, or Firm—Gerald J. Ferguson, Jr.

[57] ABSTRACT

A seat belt system for a vehicle has a seat belt which is adapted to be supported by a belt guide and a buckle respectively provided on the outer side of the passenger seated on the seat adjacent to the doors and on the inner side of the passenger remote from the doors, and a retractor fixed to the rear door. The retractor has a casing for retractably accommodating one end portion of the seat belt and a lock mechanism which prevents the seat belt from being drawn out from the casing when horizontal acceleration acting on the vehicle body exceeds a predetermined value.

19 Claims, 10 Drawing Sheets

AUTOMOTIVE SEAT BELT SYSTEM AND RETRACTOR DEVICE FOR SEAT BELT SYSTEM

BACKGROUND OF THE INVENTION

1. Field of the Invention

This invention relates to an automotive seat belt system for a vehicle and a seat belt retractor device for the seat belt system.

2. Description of the Prior Art

Conventionally, a seat belt is passed through a seat belt guide provided on an upper portion of the center pillar of the vehicle body and is connected to a seat belt retractor device fixed to the vehicle body at the lower end of the center pillar. With such an arrangement, the angle by which the seat belt is bent at the seat belt guide is inherently small, and accordingly relatively heavy load acts on the seat belt guide for a given load acting on the seat belt upon collision. In order to withstand heavy load, the seat belt guide mounting portion must have a sufficient rigidity.

In a four-door pillarless hardtop, the seat belt guide is fixed to the roof of the vehicle body and accordingly, the seat belt extends vertically across the side window to dispel open feeling which is particularly expected of the pillarless hardtop. When the seat belt guide is mounted on the seat back in order to avoid this problem with the seat belt retractor device being fixed to the vehicle at the lower end of the center pillar, heavy load acts on the seat belt guide as described above and accordingly, in order to ensure performance of the seat belt in this case together with sufficient rigidity of the seat belt guide mounting portion, the size and the weight of the seat must be large.

SUMMARY OF THE INVENTION

In view of the foregoing observations and description, the primary object of the present invention is to provide a seat belt system which can effectively hold the passenger without increasing the size and weight of the mounting portion of the seat belt guide.

Another object of the present invention is to provide a seat belt retractor device useful to accomplish the above object.

In accordance with one aspect of the present invention, there is provided a seat belt system for a vehicle having front and rear doors provided on each side of the vehicle body with a center pillar intervening therebetween and a seat provided inside the vehicle body, comprising a seat belt which is adapted to be supported by first and second support means respectively provided on the inner side of the passenger seated on the seat adjacent to the doors and on the outer side of the passenger remote from the doors, and a retractor fixed to the rear door, the retractor having a casing means for retractably accommodating one end portion of the seat belt and a lock means which prevents the seat belt from being drawn out from the casing means when horizontal acceleration acting on the vehicle body exceeds a predetermined value.

In accordance with another aspect of the present invention, there is provided a seat belt retractor device which is mounted on a door of a vehicle comprising a casing means for retractably accommodating one end portion of the seat belt, a lock means which prevents the seat belt from being drawn out from the casing means when horizontal acceleration acting on the vehicle body exceeds a predetermined value, a detecting means for detecting whether the rear door is opened or closed, and a control means which controls said lock means to prevent the seat belt from being drawn out from the casing means at a higher horizontal acceleration when the door is opened than when the door is closed.

DESCRIPTION OF THE PREFERRED EMBODIMENT

Figure 1:
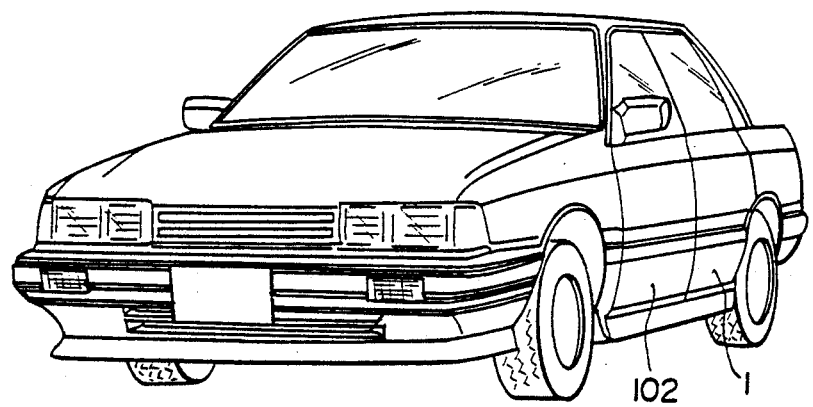
FIG. 1 is a perspective view showing a vehicle provided with a seat belt system in accordance with an embodiment of the present invention.
Figure 2:
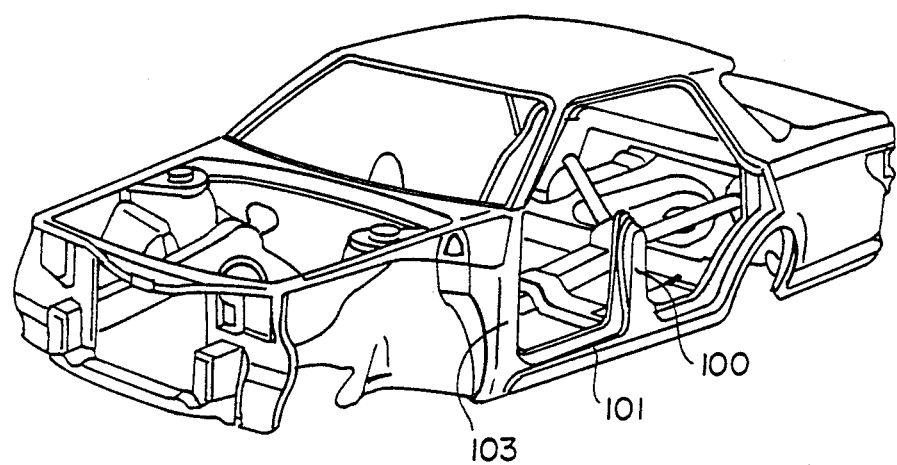
FIG. 2 is a perspective view of the vehicle with some parts being removed in order to show the inside of the vehicle body.
Figure 3:
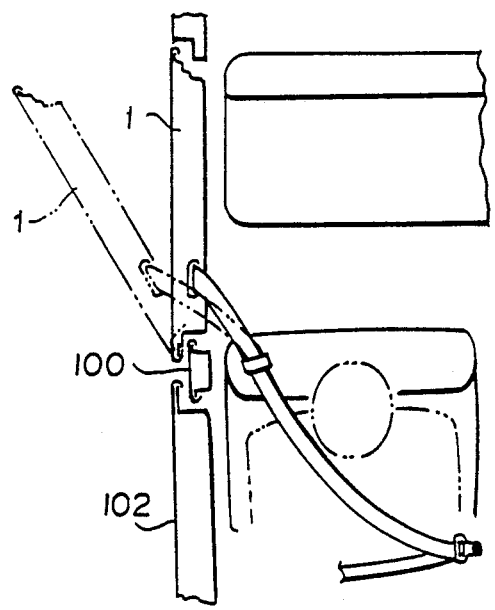
FIG. 3 is a fragmentary plan view for illustrating the condition when the seat belt system is in use.
Figure 4:
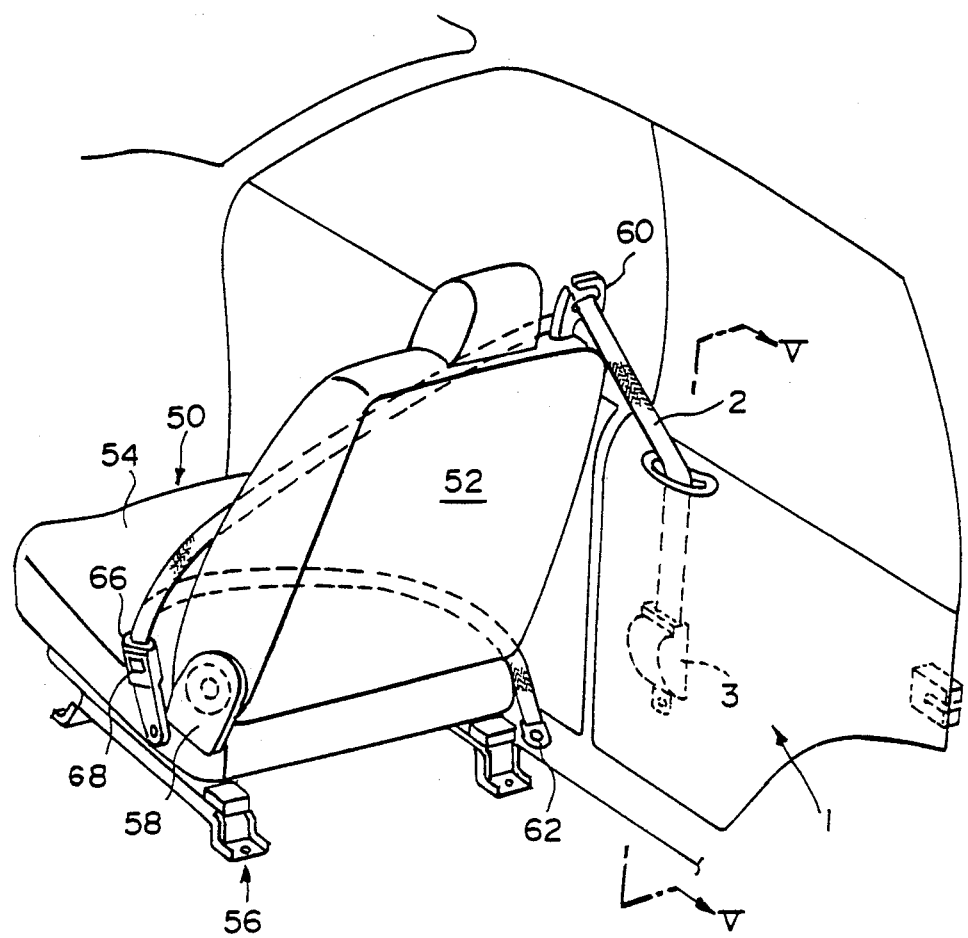
FIG. 4 is a perspective view showing the seat belt system.

A seat belt system in accordance with an embodiment of the present invention is provided in a vehicle body of a pillarless hardtop such as shown in FIGS. 1 to 3. As best shown in FIG. 2, the vehicle body has a center pillar 100 which is connected to a side sill 101 at the lower end and is belt-line high. The vehicle body has a pair of front doors 102 and a pair of rear doors 1. Each front door 102 is hinged on a hinge pillar 103 and each rear door 1 is hinged on the center pillar 100. In FIG. 4, the seat belt system comprises a retractor 3 which is mounted on a rear door 1 and adapted to take up a seat belt 2 for a front seat 50, and a door switch 4 which is built in a lock device of the rear door 1 and detects whether the rear door 1 is closed or opened. The seat belt 2 drawn out from the retractor 3 is passed through a seat belt guide 60 and the outer end of the seat belt 2 is fixed to the vehicle body by way of a seat belt anchor 62 fixed to the side sill 101 of the vehicle body. The seat belt 2 is provided with an adjustable clasp 66 which is brought into engagement with a buckle 68 when the seat belt system is used as shown in FIG. 3. The seat belt guide 60 is fixedly mounted on the seat back 52 of the front seat 50 at an outer side portion of the top of the seat back 52. The buckle 68 is mounted on the front seat 50 on the inner side of the seat cushion 54 thereof. The buckle 68 may be directly fixed to the vehicle body (floor) on the inner side of the front seat 50. As shown in FIG. 4, the front seat 50 is provided with a sliding mechanism 56 and a reclining mechanism 58.

Figure 5:
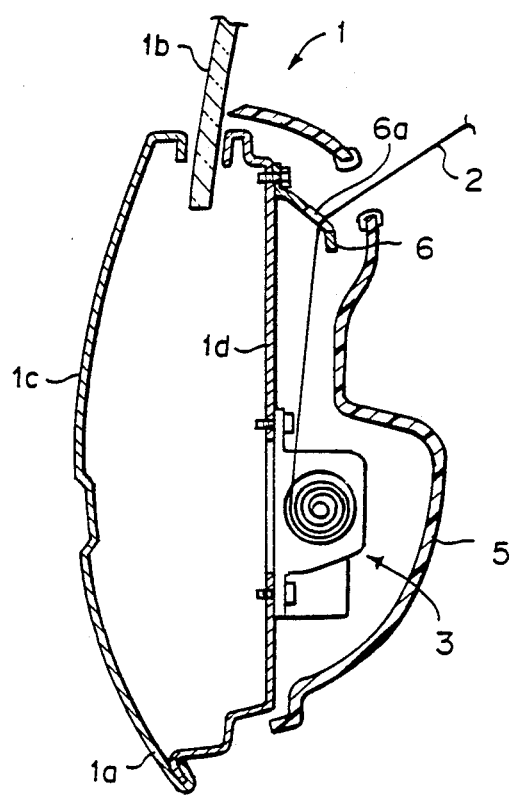
FIG. 5 is a cross-sectional view taken along line V—V in FIG. 4.

As shown in FIG. 5, the rear door 1 comprises a door body 1a and a door windowpane 1b mounted on the door body 1a to be slid up and down. The door body 1 comprises an outer panel 1c and an inner panel 1d connected together to form a closed cross-section. The retractor 3 is fixed to a lower portion of the inner panel 1d of the rear door 1, and the seat belt 2 is drawn out through an opening 5a formed in an upper portion of a door trim 5 and a guide groove 6a of a guide member 6 fixed to an upper portion of the inner panel 1d.

Figure 6:
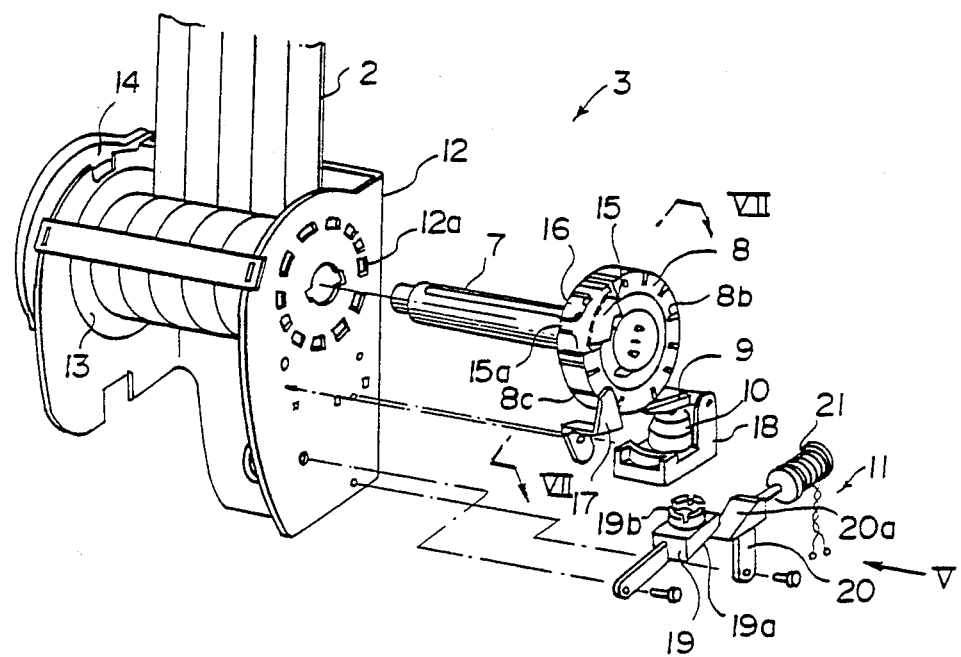
FIG. 6 is an exploded perspective of the retractor employed in the seat belt system.
Figure 7:
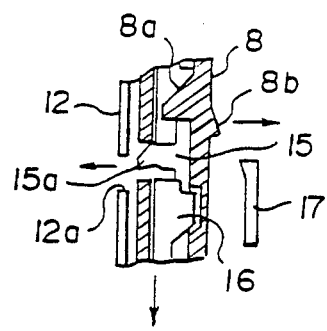
FIG. 7 is a fragmentary cross-sectional view taken along line VII—VII in FIG. 6.

As shown in FIG. 6, the retractor 3 comprises a retractor shaft 7, a ratchet wheel 8, a ratchet lever 9, a weight 10, and a control means 11.

The retractor shaft 7 is supported for rotation on a retractor base 12, channel-shaped in cross-section, coaxially with a spool 13 around which the seat belt 2 is wound, and is urged to rotate in the same direction as the direction in which the spool 13 is rotated to take up the seat belt 2 under the force of a take-up spring 14.

The ratchet wheel 8 together with a latch ring 15 and a cam plate 16 is connected to an end of the ratchet wheel 8 to be rotated together therewith. The latch ring 15 and the cam plate 16 are always rotated together with the retractor shaft 7. On the other hand, though the ratchet wheel 8 rotated together with the retractor shaft 7 in the belt take-up direction, when an abrupt rotational force acts on the retractor shaft 7 in the belt drawing direction or when a force preventing rotation of the retractor shaft 7 in the belt drawing direction acts on the ratchet wheel 8, the latch ring 15 rides on an inclined portion 8a formed on the inner side of the ratchet wheel 8 and is displaced toward the retractor base 12, whereby pawls 15a of the latch ring 15 are brought into engagement with perforations 12a formed in the retractor base 12 to prevent the seat belt 2 from being drawn out.

As shown in FIG. 6, on the outer side surface and the outer peripheral surface of the ratchet wheel 8 are respectively formed a plurality of first and second ratchets 8b and 8c at regular intervals in the circumferential direction of the ratchet wheel 8. The first ratchets 8b is engaged with a tooth 17 disposed near the side surface of the ratchet wheel 8 to prevent rotation of the ratchet wheel 8, thereby preventing draw of the seat belt 2, when it is abruptly drawn. The second ratchets 8c is adapted to be engaged with the ratchet lever 9 for the purpose which will become apparent later.

Figure 8:
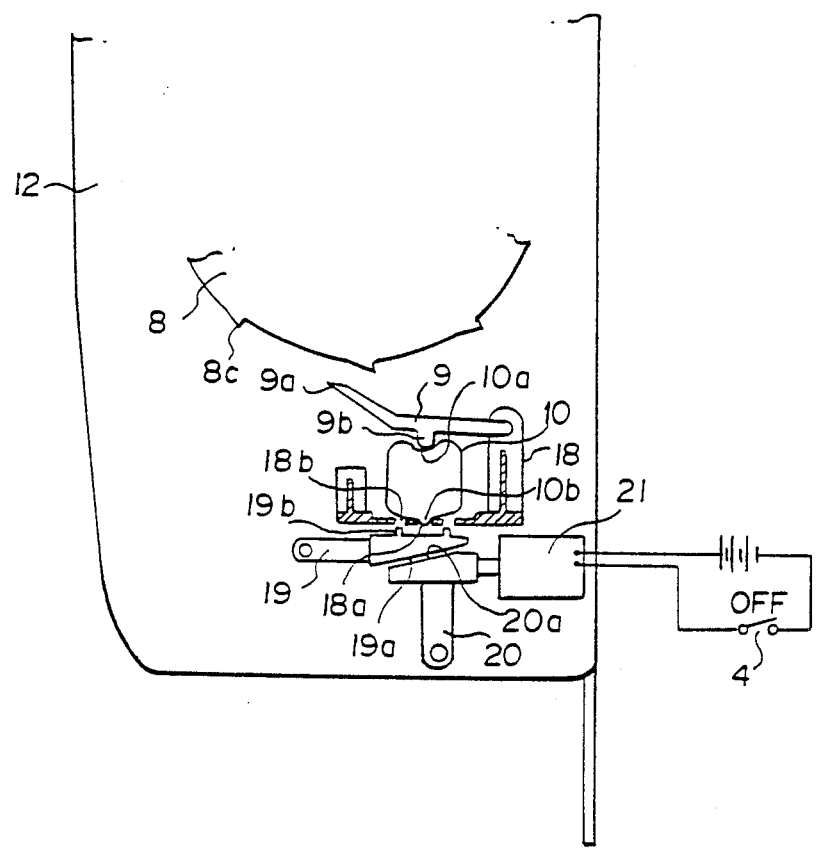
FIG. 8 is a side view as viewed in the direction of arrow VIII in FIG. 6, FIGS. 9 and 10 are views similar to FIG. 8 for illustrating the operation of the retractor.

As shown in FIG. 8, the ratchet lever 9 is pivoted on a weight support member 18 at one end to be swingable up and down, the weight support member 18 being mounted on the retractor base 12. When the ratchet lever 9 is swung upward by an angle larger than a predetermined angle, the other end portion 9a thereof abuts against the outer peripheral surface of the ratchet wheel 8. When the ratchet wheel 8 is rotated in the belt drawing direction while the end portion 9a of the ratchet lever 9 is in abutment against the ratchet wheel 8, the end portion 9a of the ratchet lever 9 is engaged with the ratchet 8c of the ratchet wheel 8 to prevent draw of the seat belt 2. From an intermediate portion of the ratchet lever 9 projects downward an arcuate projection 9b, and the projection 9b is supported on the weight 10.

The weight 10 is substantially cylindrical in shape and is provided with a spherical recess 10a and a projection 10b respectively formed on top surface and the bottom surface coaxially with the cylindrical weight 10. The bottom surface of the weight 10 around the the projection 10b is slightly inclined. The weight 10 is placed on the weight support member 18 with the projection 10b received in a locator hole 18a formed in the weight support member 18. The locator hole 18a is disposed so that when the weight 10 is placed on the weight support member 18 in the manner described above, the projection 9b of the ratchet lever 9 abuts against the center of the spherical recess on the top surface of the weight 10.

Figure 9:
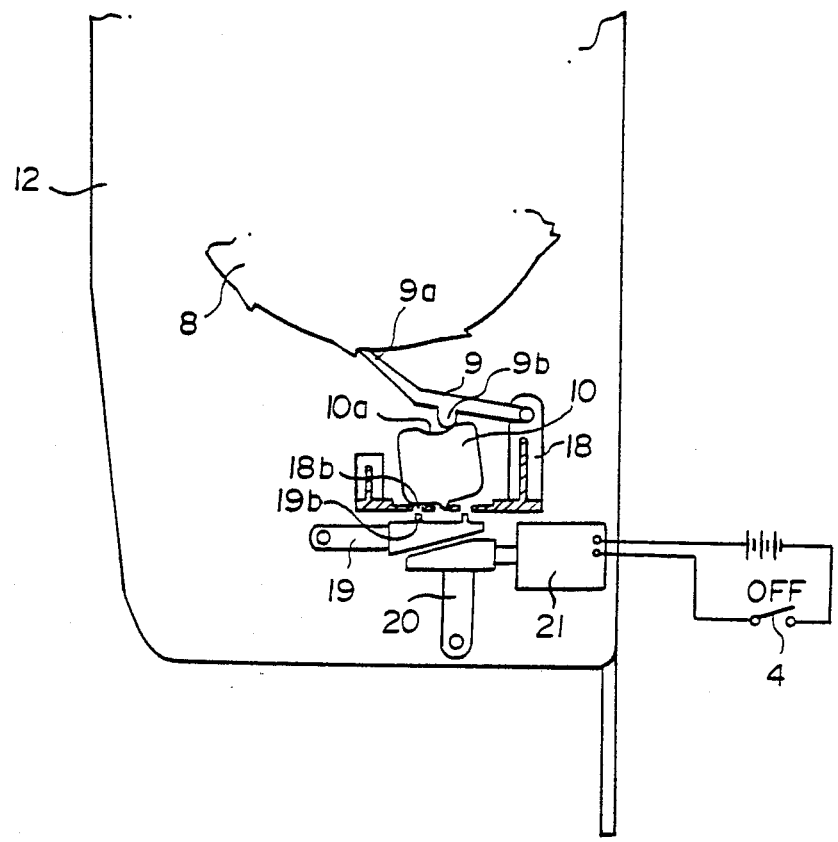
Figure 10:
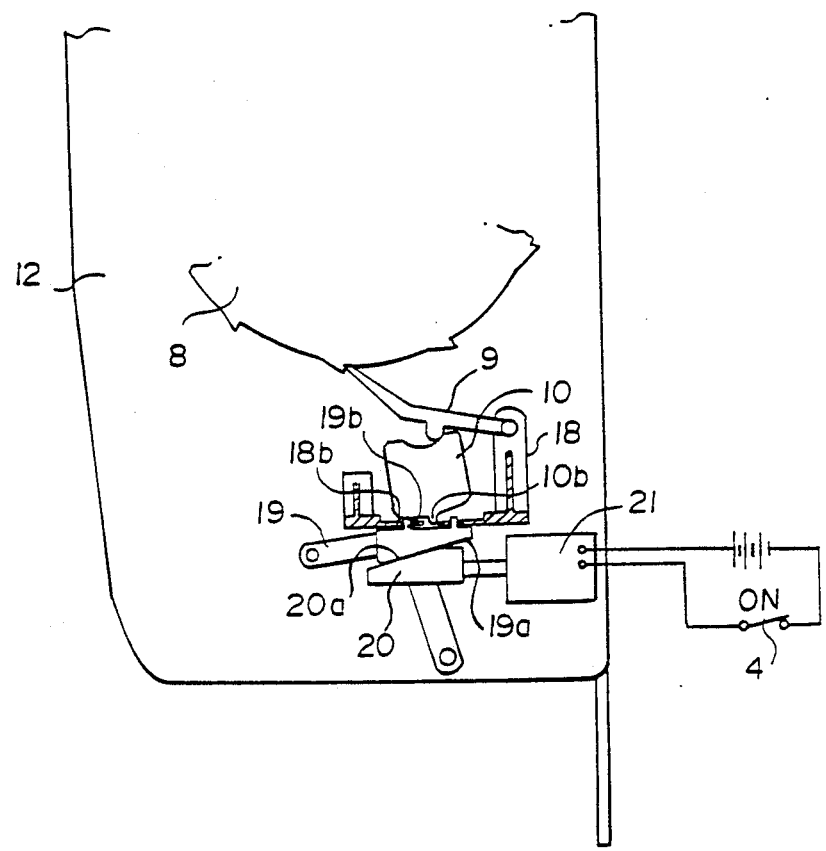

The weight 10 is swung according to the horizontal acceleration of the door. When the horizontal acceleration is 0 or nearly 0, the weight 10 stands vertical as shown in FIG. 8, while when the horizontal acceleration exceeds a predetermined value, the weight 10 is inclined as shown in FIG. 9. When the weight 10 is inclined, the abutment portion of the projection 9b of the ratchet lever 9 and the spherical recess 10a of the weight 10 changes. That is, when the weight 10 is erected, the projection 9b abuts against the central portion, or the lowest portion of the spherical recess 10a, and accordingly, when the weight 10 is inclined and the abutment portion of the projection 9b and the spherical recess 10a changes, the projection 9b is pushed upward to swing upward the ratchet lever 9, whereby the end 9a of the ratchet lever 9 is brought into abutment against the ratchet wheel 8. Since the weight 10 is substantially in shape, the same result can be obtained irrespective of the direction of the inclination of the weight 10. The value of acceleration at which the weight 10 is inclined by an angle sufficient to bring the ratchet lever 9 into abutment against the ratchet wheel 8 is selected so that when the position of the driver and/or the passenger is to be held as when running a rough road, the ratchet lever 9 is brought into abutment against the ratchet wheel 8 to prevent draw of the seat belt 2.

As shown in FIG. 9, the control means 11 is disposed below the weight support member 18. The control means 11 comprises a pair of lock acceleration control members 19 and 20 mounted for rotation on the retractor base 12, and a solenoid 21 for driving the lock acceleration control member 20. The lower surface of the lock acceleration control member 19 and the upper surface of the lock acceleration control member 20 are respectively provided with inclined surfaces 19a and 20a opposed to each other. Four projections 19b projects upward from the upper surface of the lock acceleration control member 19. The four projections 19b are arranged in a circle of a predetermined diameter and project to a predetermined height. Further, as shown in FIG. 8, four through holes 18b are formed in the weight support member 18 arranged in a circle about the locator hole 18a. The four projections 19b are adapted to project from the upper surface of the weight support member 18 through the holes 18b to a predetermined height when the lock acceleration control member 19 is swung upward by a predetermined angle.

The solenoid 10 is operated on the basis of whether the door 1 is opened or closed detected by the door switch 4. That is, when the door 1 is closed, the solenoid 21 is not operated. On the other hand, when the door 1 is opened, the solenoid 21 is operated to drive the lock acceleration control member 20 toward the lock acceleration control member 19. When the lock acceleration control member 20 moves toward the lock acceleration control member 19, the latter is swung upward by way of abutment of the inclined surface 20a against the inclined surface 19a.

When the lock acceleration control member 19 is swung upward and the projections 19b projects upward from the upper surface of the weight support member 18, the weight 10 comes to be supported by both the weight support member 18 and the projections 19b of the lock acceleration control member 19. Since the projections 19b support the weight 10 at portions radially away from the projection 10b of the weight 10, the weight 10 is not swung until the horizontal acceleration becomes extremely high, as upon collision.

In accordance with this embodiment, the sensitivity of the weight 10 is changed depending upon whether the door 1 is opened or closed, that is, the lock acceleration at which the weight 10 is inclined to such an extent that the ratchet lever 9 is brought into abutment against the ratchet wheel 8 is changed according to whether the door 1 is opened or closed. Accordingly, for example, when running a rough road (normally the door is closed), the seat belt 2 is prevented from being drawn and the position of the passenger is held, and on the other hand, when the door 1 is opened and closed for getting on and off, the seat belt 2 is not prevented from being drawn and the passenger is not unnecessarily restrained. Further, when the acceleration becomes extremely high as upon collision, the seat belt 2 is prevented from being drawn irrespective of whether the door 1 is opened or closed to protect the passenger. While running a smooth road or the acceleration is substantially 0, the belt 2 is not prevented from being drawn and the passenger is not unnecessarily restrained.

Figure 11A:
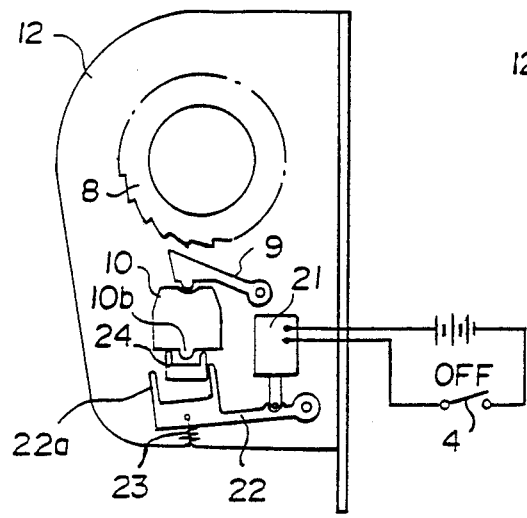
FIGS. 11a and 11b are views similar to FIGS. 9 and 10 but showing the operation of a modification of the retractor.
Figure 11B:
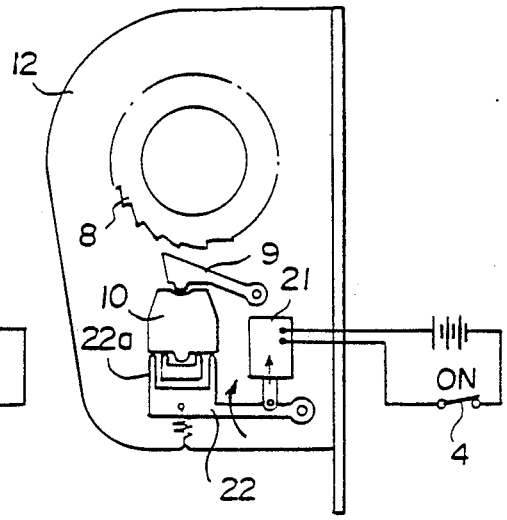

In stead of the lock acceleration control members 19 and 20, the lock acceleration control member 22 shown in FIGS. 11a and 11b may be employed. The lock acceleration control member 22 is mounted to be swingable up and down on the retractor base 12 and is urged downward by a tension spring 23. When the door 1 is opened and the door switch 4 is turned on, the solenoid 21 swings upward the lock acceleration control member 22 overcoming the force of the spring 23. The control member 22 is provided with a ring-like weight support portion 22a and when the control member 22 is swung upward, the weight support portion 22a is brought into abutment against the bottom surface of the weight 10 to support the weight 10 together with a weight support member 24 which supports the weight 10 by itself when the door 1 is closed.

Figure 12:
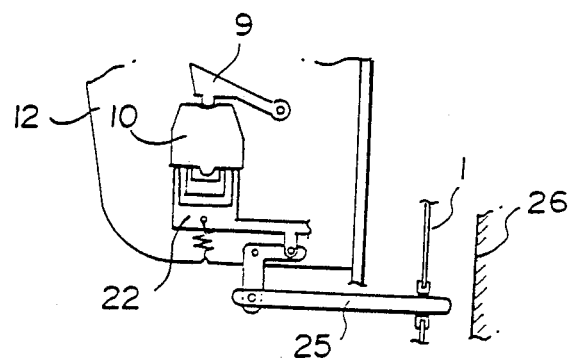
FIGS. 12 to 15 are views similar to FIG. 8 but showing various modifications of the retractor.

In stead of electrically detecting whether the door 1 is opened or closed by the door switch 4 as in the modification shown in FIGS. 8a and 8b, whether the door 1 is opened or closed may be mechanically detected by a link mechanism as shown in FIG. 12. In FIG. 12, a link 25 is positioned so that one end thereof projects outside the door 1, and when the door 1 is closed, the link 25 abuts against the vehicle body 26 (e.g., the center pillar) and is pushed inwardly, thereby swing downward the lock acceleration control member 22.

Figure 13:
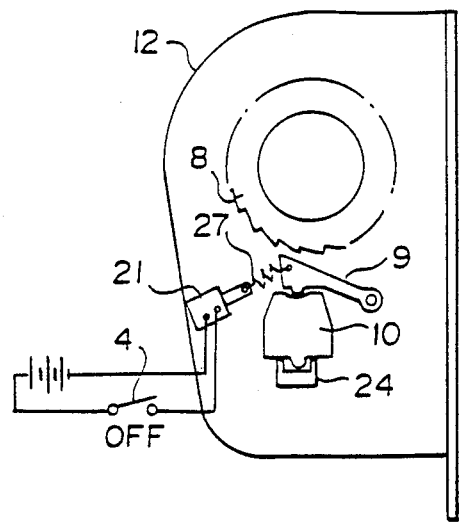
Figure 14:
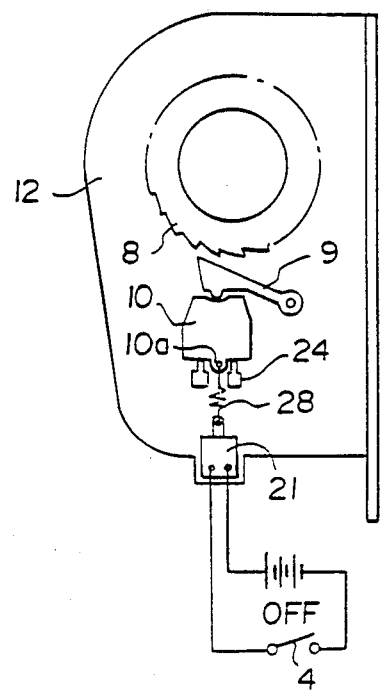

In still another modification shown in FIG. 13, the ratchet lever 9 is connected with the solenoid 21 by way of a tension spring 27 so that when the door 1 is opened and the door switch 4 is closed to energize the solenoid 21, the ratchet lever 9 is pulled downward to push the weight 10, thereby resisting swing of the weight 10. In still another modification shown in FIG. 14, the projection 10b of the weight 10 is connected with the solenoid 21 by way of a tension spring 28 so that when the door 1 is opened and the door switch 4 is closed to energize the solenoid 21, the weight 10 is pulled downward, thereby resisting swing of the weight 10.

Figure 15:
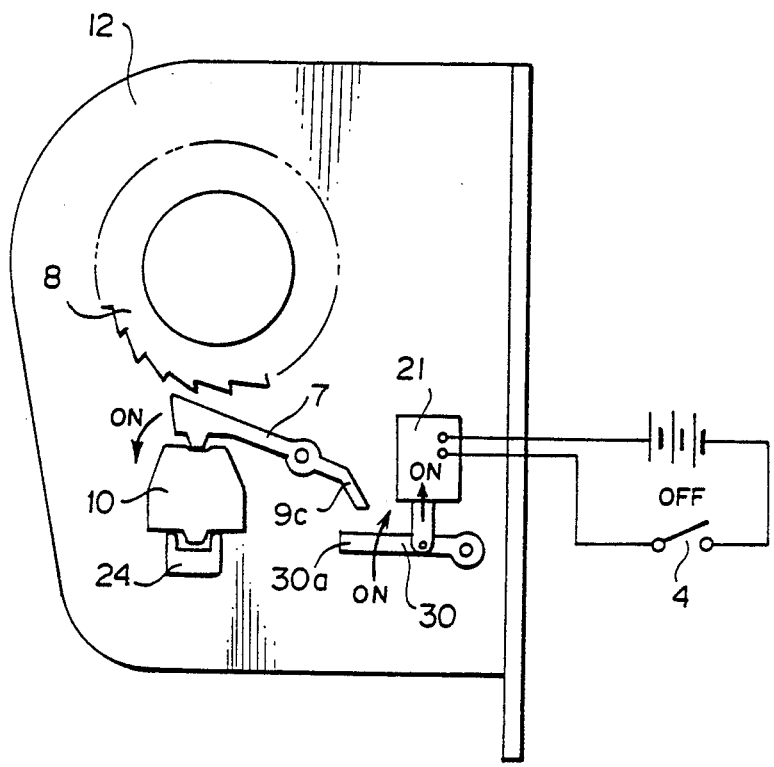

In still another modification shown in FIG. 15, the ratchet lever 9 has an extension 9c extending in the direction opposite to the end 9a, and the lock acceleration control member is in the form a lever 30 pivoted at one end thereof and rotatably connected to the solenoid 21 at an intermediate portion. When the door 1 is opened and the door switch 4 is closed to energize the solenoid 21, the lever 30 is clockwisely swung to swing the ratchet lever 9 by way of abutment against the extension 9c in the counterclockwise direction, thereby pressing the ratchet lever 9 against the weight 10, and resisting swing of the weight 10.

I claim:

1. A seat belt system for a vehicle having front and rear doors provided on each side of the vehicle body with a center pillar intervening therebetween and a seat provided inside the vehicle body, comprising a seat belt which is adapted to be supported by first and second support means respectively provided on the outer side of the passenger seated on the seat adjacent to the doors and on the inner side of the passenger remote from the doors, and a retractor fixed to the rear door, the retractor having a casing means for retractably accommodating one end portion of the seat belt and a lock means which prevents the seat belt from being drawn out from the casing means when horizontal acceleration acting on the vehicle body exceeds a predetermined value.

2. A seat belt system as defined in claim 1 in which the upper end of the center pillar is lower than the belt line defined by upper edges of the front and rear door bodies.

3. A seat belt system as defined in claim 2 in which said first support means is a seat belt guide which is mounted on an outer upper portion of the seat and said second support means is fixed at a lower inner portion of the seat.

4. A seat belt system as defined in claim 1 in which said seat belt is supported by the first and second support means to obliquely extend from the outer upper side of the seat to the inner lower side of the seat when in use.

5. A seat belt system as defined in claim 4 in which the upper end of the center pillar is not higher than the belt line defined by upper edges of the front and rear door bodies, and the front and rear doors are in the form of a sashless door comprising a door body and a windowpane provided on the door body to be movable up and down.

6. A seat belt system as defined in claim 1 in which said rear door comprises a door body and a windowpane provided on the door body to be movable up and down, and the door body comprises outer and inner panels and a cover member which covers the whole inner panel, said retractor being fixed to the inner panel and said seat belt projecting outside the door body through an opening formed in the cover member.

7. A seat belt system as defined in claim 6 in which said retractor is mounted on the side of the inner panel facing inside the vehicle body, and a seat belt guide means for supporting the seat belt is provided near the opening in the cover member.

8. A seat belt system as defined in claim 1 in which said retractor is provided with a control means which controls said predetermined value of the horizontal acceleration.

9. A seat belt system as defined in claim 8 in which said retractor has a detecting means for detecting whether the rear door is opened or closed, and said control means controls said lock means to prevent the seat belt from being drawn out from the casing means at a higher horizontal acceleration when the door is opened than when the door is closed.

10. A seat belt retractor device which is mounted on a door of a vehicle comprising a casing means for retractably accommodating one end portion of the seat belt, a lock means which prevents the seat belt from being drawn out from the casing means when horizontal acceleration acting on the vehicle body exceeds a predetermined value, a detecting means for detecting whether the rear door is opened or closed, and a control means which controls said lock means to prevent the seat belt from being drawn out from the casing means at a higher horizontal acceleration when the door is opened than when the door is closed.

11. A seat belt retractor device as defined in claim 10 in which said casing means comprises a take-up spool for taking up the seat belt, said lock means comprises a gear member connected to the take-up spool to be able to rotate together with the take-up spool, a pawl member adapted to be engaged with the gear member, and an actuator which brings the pawl member into engagement with the gear member when the horizontal acceleration exceeds said predetermined value.

12. A seat belt retractor device as defined in claim 11 in which said actuator comprises a swinging member which is supported by a support member and is adapted to swing in response to the horizontal acceleration of the door and to bring said pawl member into engagement with said gear member when its swing exceeds a predetermined extent, and said control means includes a resisting means for resisting swing of the swinging member when the door is opened.

13. A seat belt retractor device as defined in claim 11 in which said support member supports the swinging member so that its supporting span is variable with the swinging member becoming harder to swing as the supporting span becomes wider, and said resisting means comprises a span changing means for changing the supporting span of the support member when the door is opened.

14. A seat belt retractor device as defined in claim 13 in which said support member comprises a short span support member fixed to the door and a long span support member movable between an operative position in which it supports the swinging member and a retracted position in which it is positioned away from the swinging member, and said span changing means comprises a driving means for moving the long span support member between the operative position and the retracted position according to whether the door is opened or closed.

15. A seat belt retractor device as defined in claim 14 in which said driving means comprises an actuator member which is adapted to act on the long span support member by way of a cam surface so that the long span support member is moved between the operative position and the retracted position by driving the actuator member.

16. A seat belt retractor device as defined in claim 14 in which said long span support member is connected to a lever member supported for swinging motion, and the driving means moves the long span support member by driving the lever member.

17. A seat belt retractor device as defined in claim 12 in which said resisting means comprises a means for pressing said swinging member against the support member when the door is opened.

18. A seat belt retractor device as defined in claim 12 in which said resisting means comprises a means for pressing said pawl member against the swinging member when the door is opened.

19. A seat belt system for a vehicle having front and rear doors provided on each side of the vehicle body with a center pillar intervening therebetween and a front seat provided inside the vehicle body, comprising a seat belt which is adapted to be supported to extend across the front side of the front seat by first and second support means respectively provided on the outer side of the front seat adjacent to the doors and on the inner side of the front seat remote from the doors, and a retractor fixed to the rear door, the retractor having a casing means for retractably accommodating one end portion of the seat belt, a lock means which prevents the seat belt from being drawn out from the casing means when horizontal acceleration acting on the vehicle body exceeds a predetermined value, a detecting means for detecting whether the rear door is opened or closed, and a control means which controls said lock means to prevent the seat belt from being drawn out from the casing means at a higher horizontal acceleration when the door is opened than when the door is closed.

* * * * *